March 17, 1970  A. ABRAMS ET AL  3,500,921
POLYMER-PRECEDED CHEMICAL FLOOD
Filed July 23, 1968
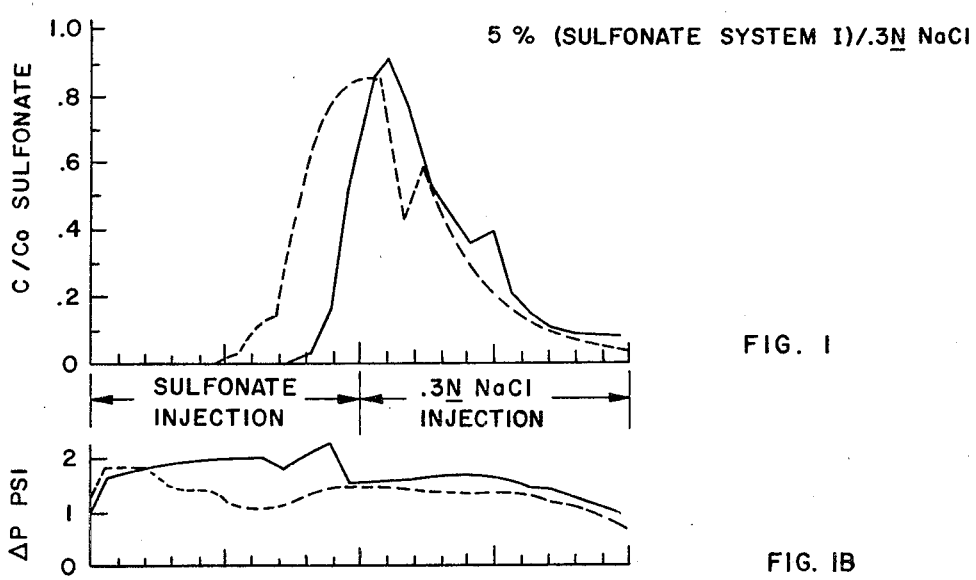
FIG. 1
FIG. 1B
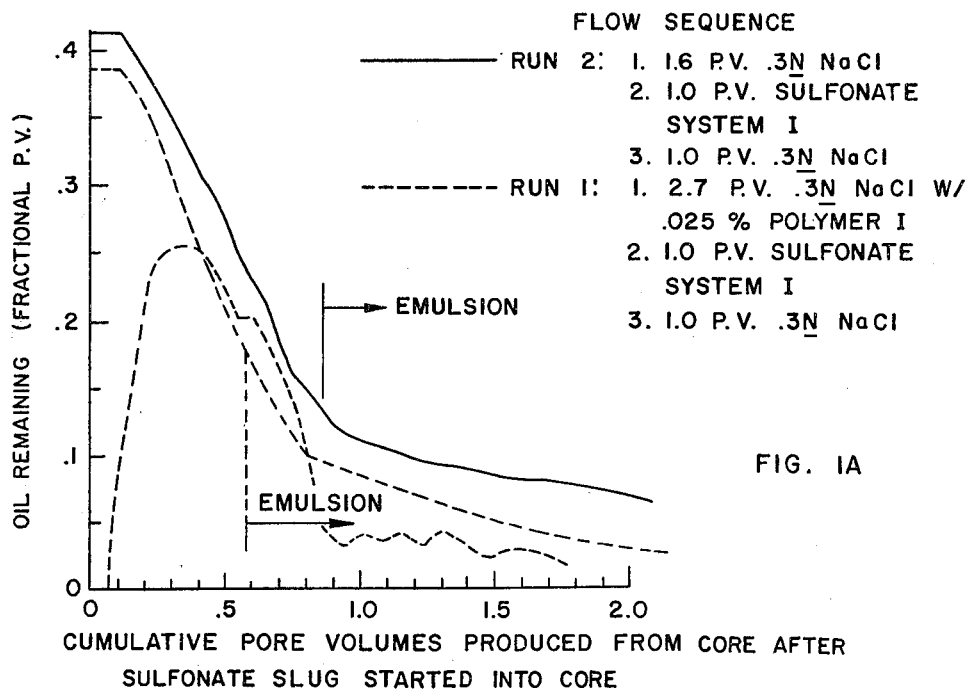
FIG. 1A
INVENTORS:
ALBERT ABRAMS
JIMMIE B. LAWSON
BY:
THEIR AGENT

United States Patent Office 3,500,921
Patented Mar. 17, 1970

3,500,921
POLYMER-PRECEDED CHEMICAL FLOOD
Albert Abrams and Jimmie B. Lawson, Houston, Tex., assignors to Shell Oil Company, New York, N.Y., a corporation of Delaware
Filed July 23, 1968, Ser. No. 746,817
Int. Cl. E21b 43/16, 43/22
U.S. Cl. 166—273     7 Claims

ABSTRACT OF THE DISCLOSURE

An improved method for oil recovery from an underground oil-bearing formation by pretreating the oil-bearing formation zone, prior to injecting a driving fluid therein, with sequential slugs (1) an aqueous solution thickened with a polymeric material containing in the molecule amide and —COOX units wherein X is an alkali metal or ammonia and the —COOX units comprise a significant proportion of the total polar constituents of the polymer and (2) a saline solution containing organic sulfonate surfactant micelles in combination with molecules of amphiphilic organic sulfonate of low water solubility.

BACKGROUND OF THE INVENTION

This invention relates to the displacement of oil from the pores of subterranean, oil-containing reservoirs, and more particularly to special surface-active systems to be used with "waterflooding" techniques to improve the oil displacement efficiency of waterfloods.

Knowledge is widespread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary and tertiary recovery" techniques which have as their primary purpose the economical recovery of additional quantities of the residual oil known to be present in the reservoir.

Probably, one of the more common secondary recovery techniques is the so-called "waterflooding" in which aqueous fluids are injected at one point in the reservoir at pressures sufficient to be forced out into the reservoir and toward a spaced production well or wells, there, in effect, displacing oil from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor of whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within the pores of the rock formations by capillarity merely forcing water therethrough will not displace much of this trapped oil. However, a reduction in the interfacial tension between the water and the oil will tend to increase the amount of oil that will be displaced by the water. Thus, various aqueous surfactant systems have been proposed for use in water-flooding processes for recovering oil. In many such prior systems the interfacial tension between the oil and water is reduced from a characteristic value in the order of 50 dynes per centimeter to a value of from about 1 to 10 dynes per centimeter. If the interfacial tension is reduced to only about 10 dynes per centimeter the increase in the amount of oil that can be recovered is not generally significant. Thus, in many cases the cost of providing enough surfactant to satisfy the adsorptive capacity of the rock and yielding the desired reduction in the interfacial tension is apt to be more than the value of the increased amount of oil that is recovered.

Many aqueous systems containing surfactants have been used as aids in oil recovery and among the most promising of such systems are described in U.S. Patents 3,330,344 and 3,348,611 in which improved and effective oil recovery is achieved by treating the formation with an aqueous liquid containing an oil-solubilizing aqueous solution of surfactant micelles that are combined with molecules of an amphiphilic organic compound of low water solubility. In many such systems oil is recovered by injecting an aqueous liquid to drive the surfactant system and the oil toward a production well.

Although the above aqueous systems function effectively in improving oil recovery relatively large amounts of the additive mixture are required to effect substantial increase in oil recovery; large losses which are not recoverable of these additives are encountered because of their high adsorptive tendencies for the rock formation and in some reservoirs their effectiveness is reduced because of plugging due to precipitation when such systems come in contact with polyvalent metal ions. The polyvalent metal ions may be present in the injection water used to form the aqueous systems described in the above-mentioned patents or connate water containing polyvalent metal ions present in the underground production zones of formations from which oil is to be recovered. Under such conditions, precipitation of the surfactant generally requires the use of high injection pressures to drive the oil towards the production well. As is well known if the injection pressures become too high, the reservoir can be damaged.

SUMMARY OF THE INVENTION

It has now been discovered that oil recovery can be improved at substantially reduced pressures and additive concentrations than previously used in the art by injecting in sequence into the oil producing zone of an oil-containing formation, prior to injecting a drive fluid: (A) a slug of an aqueous solution thickened with a water-soluble polymeric material containing in the molecule a plurality of —CONH$_2$ and —COOX units wherein X is an alkali metal or ammonia which can block or randomly distributed and in which the —COOX units comprise a significant proportion of the total polar constituents of the polymer and the polymer having a molecular weight of at least 1 million and preferably above 2 million and it can be up to 10 million or higher; followed by injection of (B) a slug of a saline solution of an organic sulfonate surfactant micelles that are combined with molecules of an amphiphilic organic sulfonate compound of low water solubility. By pretreating the formation with a slug of thickened aqueous solution (A) the adsorptive, gelling and plugging tendencies of saline solution (B) are greatly reduced without detracting from any beneficial properties that such a solution imparts to an oil recovery process as practiced by the process of the present invention. Also, such sequential slug injection results in the use of less surfactant and greater oil recovery so that substantial economic benefits are also derived.

In accordance with the process of this invention for displacing oil in a porous earth formation and recovering oil therefrom, the steps comprise:

(1) Optimally injecting an aqueous solution containing a clay anti-swelling and plugging agent such as sodium chloride;

(2) Injecting a slug of an aqueous solution or liquid containing a thickener as defined above;

(3) Injecting a saline solution or liquid containing organic sulfonate compounds having sulfonate units of good water-solubility and low-water solubility; and finally (4) Injecting a drive fluid to force the displaced oil to a production well from which the oil is recovered by any suitable means.

If desired, the clay anti-swelling agent can be incorporated into solution (2) thereby eliminating step (1).

The inorganic solute which imparts salinity to aqueous liquids used in solution (3) and optimally in (1) and/or (2) includes the alkali metal halides such as Na, K and/or Li chloride, bromide, iodide and mixtures thereof, of which preferred is NaCl and such solutions may be dilute or concentrated brine solutions and the like. Preferred are brine solutions having a salt concentartion of from 0.01% to 20% and preferably 0.1 and 0.5 meq./gm.

The water-soluble polymeric thickener used to pretreat the oil-containing formation prior to treatment with a selective surfactant containing aqueous slug and which solution functions synergistically with solution (3) as defined is a high molecular weight water-soluble polymer containing at least two essential polar groups which are —$CONH_2$ and —COOX wherein X is as defined above and comprises a significant proportion of the total polar groups in the polymer whose molecular weight should be at least 1 million and higher. These high molecular weight salts of polymers containing amide and carboxylate groups therein can be prepared from polymeric acrylamide, alkyl acrylamide, e.g., methacrylamide and mixtures thereof by hydrolizing said polyacrylamide unit so that approximately at least one third of the amide units are converted to carboxylic acid groups and said groups reacted with a neutralizing agent such as an alkali metal hydroxide, carbonate, hyposulfite, ammonium hydroxide or the like so as to completely neutralize said acid groups. An excess of the neutralizing agent can be used and such materials include sodium carbonate, sodium hydroxide, sodium hyposulfite, ammonium hydroxide and mixtures thereof. Polymers of this type can be also prepared by copolymerizing an acrylamide and an acrylic acid under such controlled conditions so that the final product contains at least 30% up to 80% of carboxylate groups in the polymeric material and the copolymer neutralized with an alkali metal compound as described. The preparation of these salts of hydrolyzed acrylic amide polymers or salts of copolymers of acrylamide and acrylic acid can be prepared by means well known in the art and as described in U.S. Patents 2,868,753; 2,886,558; 3,002,960; 3,022,279; 3,039,529 and 3,367,418. These polymers and copolymers can be modified by cross-linking or by reacting with a polymerizable monomer such as described in the German Patent 1,226,968 and includes vinyl alcohol, vinyl acetate, vinyl chloride, vinyl alkyl ether, acrylonitrile and the like. Preferred polymeric salts of hydrolyzed (30–65%) acrylic amide polymers, neutralized with an excess of from 1% to 30% sodium carbonate and having a molecular weight in the range of 1–5 million and referred in Table 1 as Polymer I. Also, preferred are the sodium hydroxide, potassium hydroxide, ammonium hydroxide salts of hydrolyzed acrylic amide polymers as well as sodium and potassium salts of copolymers of acrylamide and acrylic acids in the molecular weight range of ½–5 million. The sodium salts of hydrolyzed acrylamide are available from Dow Chemical Company under the name of "Pusher 520" or "ET 601" or "Separan" such as "Separan MGL, NP10, NP20, AP30, AP273 and PG–2" which possess ionic characteristics and contain 1–30% sodium acrylate units in the molecule and have a molecular weight range from 1 to 4 million. The polymer thickened aqueous liquid can contain an electrolyte such as sodium chloride in concentration of from 0.01% to 5%. It is preferable, in respect to at least the trailing edge portions of the polymer solution, that this solution be substantially free of polyvalent metal ions. The polymer can be used in concentrations of from 0.01% to 5% or higher depending on the desired viscosity of the solution, the permeability of the formation, type of formation, temperature, pressure and other factors involved in the injection of the thickened liquid into the formation from which oil is to be recovered.

The volume of the polymer-thickened aqueous slug should be sufficient to insure that polymer is adsorbed ahead of the surfactant-containing slug and the polymer-thickened aqueous slug volume can be as large as 1 or more pore volumes of the reservoir.

The saline containing surfactant slug which is injected after the thickened polymeric slug as described above includes saline solutions containing a mixture of alkyl aryl sulfonates in which at least one surface-active alkyl aryl sulfonate that is water soluble and is present in an amount exceeding its critical micelle concentration in the aqueous liquid is mixed with at least one surface-active alkyl aryl sulfonate that is relatively water insoluble. Such a saline liquid dispersion can be formed by mixing a saline solution with (a) both a water soluble surface-active organic sulfonate and a relatively water insoluble surface-active organic sulfonate, or alternatively (b) natural petroleum sulfonates that contain both water soluble and relatively water insoluble organic sulfonates in the necessary proportions. The procedure (b) is particularly preferred since it comprises mixing the aqueous liquid with a low cost commercially available mixture of sulfonates such as mahogany sulfonates described later. For purposes of description, a water soluble surface-active alkyl aryl sulfonate is a monosulfonate which, in the form of its sodium salt, has a molecular weight of from about 300 to 400 or is polysulfonate. A relatively water insoluble surface-active alkyl aryl sulfonate is one which, in the form of its sodium salt, has a molecular weight of more than about 450. In the present process the particularly suitable sulfonates are the mahogany sulfonates which are mixtures having average molecular weights of from about 400 to 500. Such mahogany sulfonates contain both water soluble and relatively water insoluble alkyl aryl sulfonates.

BRIEF DESCRIPTION OF THE DRAWINGS

Each abscissa=cumulative pore volume of fluid that was produced from the core after the sulfonate slug had started into the core. FIGURE 1 ordinate, $C/C_o$=ration (re each increment of produced aqueous fluid) of measured concentration of sulfonate to concentration of injected solution of sulfonate. Run 1 shows that 51.9% of the injected sulfonate was produced by the time 1 pore volume of sulfonate—following brine had been injected, when the sulfonate was preceded by thickened water—while only 42.5% was so produced when no thickener was used.

FIGURE 1B, ordinate, $\Delta P$=the injection pressure required to maintain the constant flow rate through the core.

FIGURE 1A, the ordinate in $S_{or}$, the amount of oil remaining in the core (in percentage of total pore volume) after each cumulative increment of fluid was produced (after the sulfonate slug had started into the core) Run 1 shows that more oil was produced at each stage of the process when a thickener was injected ahead of the sulfonate.

PREFERRED EMBODIMENT OF THE INVENTION

In essence, the present invention is based on the discovery that a synergistic effect is obtained in oil recovery by treating sequentially a formation containing oil with a slug of an aqueous liquid containing a thickener as defined, followed by a slug of saline solution containing organic sulfonate surfactant as defined above and thereafter followed by a drive fluid, which can be substantially any aqueous liquid, to drive the oil to a production well from which the oil is recovered. The surfactant system which can be used in a saline solution includes those described in U.S. Patent 3,330,344 and particularly as described in U.S. Patent 3,348,611.

A system used to pre-condition an oil producing well after pretreatment with a polymer thickened aqueous solution comprised of an electrolytic (NaCl) water solution containing a blend of 30% wt. of Na petroleum sulfonate (M.W.=380) and a 70% wt. of oil-soluble Na petroleum sulfonate (M.W.=470) and is referred to in the figure as Sulfonate System (I). Active sulfonate concentrate as produced contained 62.5% wt. sulfonate and the balance oil. At 95° F., the specified blend of plant product at concentrations of 0.5 and 5.0 weight percent forms effective oil recovery systems in the sodium chloride concentration range of 1.0 to 2.0 weight percent sodium chloride.

The following example illustrates the present invention in which the experiments were performed at 95° F. in 2-inches diameter x 10-inches long EPON-jacketed cores initially vacuum-saturated with 0.3 N NaCl. Initial oil saturation was established by flowing crude oil at constant pressure drop (15 p.s.i.). Subsequent flow was at a constant rate (about .8 ft./day). The polymer preflood was a .025 percent solution of Polymer I in 0.3 N NaCl and is identified in FIGURE 1–1A as Run 1 and with the Polymer I thickener it is identified as Run 2.

In addition, the effects of polymer prefloods are shown in Table 1 wherein experiment A–1 shows the results of a preflood with 0.025% thickener (Polymer I) solution, 0.15 N in NaNO$_3$ followed by 2% sulfonate System I solution, 0.15 N in NaCl which is subsequently driven by water 0.15 N in NaNO$_3$. Polymer solution was injected until the effluent solution showed a constant viscosity indicating that physical adsorption of polymer was complete. The viscosities of polymer and sulfonate were found to be slightly unfavorable for stable displacement (0.97 cp. vs. 0.84 cp.) but the sulfonate front appeared sharp. The breakthrough of sulfonate is slightly early (C/C$_o$=0.5 occurs slightly before 1 PV of injection) and precedes tracer breakthrough. This indicates that the pore volume available to sulfonate is less than the pore volume available to tracer. The sulfonate and tracer (Cl$^-$) displacements are considerably improved over almost identical experiments with no polymer preflood; as noted in experiment A–3. Based on the original pore volume of the core, 92 percent of the Cl$^-$ and 78 percent of the sulfonate in 1 PV of stock solution are recovered upon injection of 1 PV of driving solution.

A–2 in Table 1 shows the results of an experiment identical in every respect except that the polymer solution is more concentrated and, hence, more viscous (0.275 percent, 7.2 cp.). The results at the driving front are analagous to those for the previous experiment.

In experiments A–4—A–6 are shown displacement of ca. ½ PV slugs of sulfonate (M.W.=430) solutions in cores that were preflooded with various solutions of Pusher. A comparison of experiments A–4 and A–5 show that preflooding the core with Polymer I enhances slug displacement efficiency. In both cases the sulfonate slug was ca. ½ PV of 2 percent sulfonate (M.W.=430), 0.15 N in NaCl. The core used in experiment A–4 was preflooded with ca. 1 PV of a 0.025 percent solution of Polymer I, 1 percent in NaNO$_3$. The figures for A–1 show that effluent solution viscosity for this quantity

TABLE 1.—SOLUTION DATA

| Experiment | A–1 | A–2 | A–3 | A–4 | A–5 | A–6 |
|---|---|---|---|---|---|---|
| Core pretreatment: | | | | | | |
|   Solute | NaNO$_3$ | Polymer I | Polymer I | Polymer I | Polymer I | Polymer I |
|   Concentration | 1% | (1) | (2) | (3) | (3) | (4) |
|   PV | 2 | 5.94 | 4.97 | 1.00 | 2.10 | 1.77 |
|   Viscosity (cp.) | | 7.175 | 0.969 | | 1.855 | 1.426 |
| Surfactant solution data: | | | | | | |
|   Sulfonate | (5) | (5) | (5) | (5) | (5) | (5) |
|   Concentration (meq./gm.) | 0.0283 | 0.0311 | 0.0299 | 0.0294 | 0.0290 | 0.0733 |
|   NaCl (tracer) concentration (meq./gm.) | 0.1525 | 0.1535 | 0.1513 | 0.1517 | 0.1514 | 0.2037 |
|   Viscosity | 0.849 | 0.828 | 0.841 | 0.891 | | 1.522 |
| pH | 9.74 | | | | | |
| PV injected | 5.45 | 7.02 | 5.44 | 0.54 | 0.46 | 0.51 |
| Flow rate (ft./day) | 0.83 | 0.76 | 0.76 | 0.74 | 0.74 | 0.77 |
| Maximum pressure rise during injection (p.s.i.) | 0.2 | 0.2 | 0.2 | 0.2 | 0.1 | 0.2 |
| Calculated viscosity (Darcy's Law) based on maximum ΔP (cp.) | 2.32 | 1.98 | 2.08 | | | |
| Driving solution data: | | | | | | |
|   Solute | NaNO$_3$ | NaNO$_3$ | NaNO$_3$ | NaNO$_3$ | NaNO$_3$ | NaNO$_3$ |
|   Concentration | 1% | 0.15 N | 0.15 N | 0.15 N | 0.15 N | 0.15 N |
|   Viscosity (cp.) | 0.735 | 0.748 | 0.748 | 0.748 | | 0.755 |
|   PV | 1.3 | 1.51 | 1.51 | 1.56 | 1.41 | 1.59 |
| Effluent Solution Data: | | | | | | |
|   pH— | | | | | | |
|     At beginning of sulfonate injection | 7.92 | | | | | |
|     At end of sulfonate injection | 8.47 | | | | | |
|   Viscosity— | | | | | | |
|     At beginning of sulfonate injection | | 6.927 | 0.944 | | 1.482 | |
|     At end of sulfonate injection | | 0.919 | 0.909 | | | |
|     One PV after end of sulfonate injection | | 0.801 | 0.768 | | | |
|     1.5 PV after end of sulfonate injection | | 0.754 | 0.775 | | | |
| Cumulative sulfonate loss (meq./100 g. rock): | | | | | | |
|   At sulfonate breakthrough | 0.05 | | | 0.01 | | |
|   At end of sulfonate injection | 0.07 | | | | | |
|   One PV after end of sulfonate injection | 0.18 | | | | | |
|   1.5 PV after end of sulfonate injection | | | | | | |
| Percent of solute in 1 PV stock solution displaced by 1 PV driving solution— | | | | | | |
|   Cl$^-$ | 66 | 92 | 92 | [6] 86 | [6] 86 | [6] 75 |
|   Sulfonate | 57 | 79 | 78 | [6] 49 | [6] 70 | [6] 75 |
| Percent of solute in 1 PV stock solution displaced by 1.5 PV driving solution | | | | | | |
|   Cl$^-$ | | 100 | 99 | [6] 100 | [6] 99 | [6] 91 |
|   Sulfonate | | 82 | 82 | [6] 55 | [6] 74 | [6] 84 |
| Cumulative sulfonate loss (fraction of a monolayer surface coverage): | | | | | | |
|   At sulfonate breakthrough | 0.06 | | | | | |
|   At end of sulfonate injection | 0.08 | | | | | |
| Cumulative sulfonate and tracer loss based on total material balance (meq./100 g. rock): | | | | | | |
|   Sulfonate | 0.17 | 0.07 | 0.06 | 0.08 | 0.04 | 0.06 |
|   Cl$^-$ | 0.40 | 0.00 | 0.01 | 0.00 | 0.01 | 0.09 |

[1] 0.275%+0.15 N NaNO$_3$.
[2] 0.025%+0.15 N NaNO$_3$.
[3] 0.075%+0.15 N NaNO$_3$.
[4] 0.75%+0.15 N NaNO$_3$.
[5] Na petroleum sulfonate (M.W.=430).
[6] These figures are based on total injected solute rather than the solute in 1 PV of stock solution.

of polymer is not sufficient to satisfy the adsorptive capacity of the rock since ca. 3 PV of production are required before a constant viscosity is reached at the outflow end of the core. The core used in experiment A–5 was preflooded with 2.10 PV of a 0.075 percent solution of Polymer I. This is more than enough polymer to satisfy the rock surface requirements. It is clear from the data in Table 1 that sulfonate breakthrough precedes tracer breakthrough in experiment A–5 but not in experiment A–4. Material balance reveals that the displacement in experiment A–5 is more efficient than in experiment A–4. In experiment A–4, 49 percent of the injected sulfonate was displaced by 1 PV of driving fluid while the same volume of driving fluid displaced 70 percent of the injected sulfonate in experiment A–5. It therefore seems that the rock surface should be saturated with polymer to obtain maximum benefit from it.

In experiment A–6 a ½ PV slug of a 5 percent solution of sulfonate (M.W.=430), 0.2 N in $NaNO_3$ was displaced with 0.2 N $NaNO_3$ from a core that had previously been flooded with ca. 1¾ PV of a 0.075 percent solution of Pusher. Again, sulfonate breakthrough precedes $Cl^-$ breakthrough and both the sulfonate and tracer breakthroughs appear before 1 PV of injection. The pore volume accessible to sulfonate may have been considerably reduced. From the standpoint of slug integrity, this experiment is the best of the series with a maximum $C/C_o$ for sulfonate of 0.9 and yielding 75 percent sulfonate recovery with 1 PV of driving solution. (Table 1 appears in columns 5 and 6.)

Pretreating the formation with other thickening materials instead of the polymeric salts of the present invention such as sugar, sucrose, cellulose, e.g., carboxy methyl cellulose, and the like failed to produce the synergistic results in accordance with the teaching of the present invention.

It is understood that various changes in the details described to explain the invention can be made by persons skilled in the art within the scope of the invention as expressed in the appended claims.

We claim as our invention:
1. In an oil-producing process in which oil in an oil-containing reservoir formation is displaced in the steps comprising:
   (a) injecting a slug of thickened aqueous solution containing as the thickening agent a water-soluble polymeric material containing a plurality of

   —$CONH_2$ and —COOX units in which the —COOX units are a significant proportion of the total polar groups present in the molecule and X is selected from the group consisting of an alkali metal and ammonia, said polymer having a molecular weight of at least 1 million;
   (b) injecting a saline solution containing an organic sulfonate surfactant that exceeds the critical concentration for micelle formation and contains enough amphiphilic sulfonate groups of low-water solubility to swell the surfactant micelles; and,
   (c) injecting a drive fluid to force the displaced oil to a productiton well from which the oil is recovered.

2. The process of claim 1 wherein prior to step (a) the formation is treated with an aqueous solution containing a clay anti-swelling agent.

3. The process of claim 2 wherein the anti-swelling agent is NaCl which agent is also added to injection solution (b).

4. The process of claim 1 wherein the thickening agent is a water-soluble salt of a hydrolyzed acrylic amide polymer having at least about 30% carboxylate groups in the molecule and a molecular weight of at least 1 million and the surfactant material in step (b) is a mixture of low molecular weight alkyl aryl sulfonates which are water-soluble and high molecular weight alkyl aryl sulfonates which are water-insoluble, said low molecular weight alkyl aryl sulfonates being present in at least critical micelle concentration with amphiphilic molecules comprising said high molecular weight alkyl aryl sulfonates penetrating into and swelling the micelles.

5. The process of claim 4 wherein the polymeric salt is a sodium salt and in the sulfonate mixture the low molecular weight alkyl aryl sulfonates and the high molecular weight alkyl aryl sulfonates are sodium salts of petroleum sulfonates.

6. The process of claim 5 wherein an anti-swelling agent is added to solution of step (a) and the drive fluid of step (c) is water.

7. The process of claim 6 wherein prior to step (a) the formation is treated with an aqueous solution containing NaCl.

References Cited

UNITED STATES PATENTS

| | | | |
|---|---|---|---|
| 3,123,135 | 3/1964 | Bernard et al. | 166—275 X |
| 3,170,514 | 2/1965 | Harvey et al. | 166—275 |
| 3,302,713 | 2/1967 | Ahearn et al. | 166—274 |
| 3,324,944 | 6/1967 | Poettmann | 166—273 |
| 3,348,611 | 10/1967 | Reisberg | 166—275 |
| 3,369,602 | 2/1968 | Fallgatter et al. | 166—273 |
| 3,373,809 | 3/1968 | Cooke | 166—274 X |
| 3,406,754 | 10/1968 | Gogarty | 166—273 |
| 3,421,582 | 1/1969 | Fallgatter | 166—273 |
| 3,434,542 | 3/1969 | Dotson et al. | 166—273 |
| 3,444,930 | 5/1969 | Williams et al. | 166—273 |

STEPHEN J. NOVOSAD, Primary Examiner